(12) United States Patent
Sakamoto et al.

(10) Patent No.: US 11,456,498 B2
(45) Date of Patent: Sep. 27, 2022

(54) LITHIUM AIR SECONDARY BATTERY

(71) Applicant: Nippon Telegraph and Telephone Corporation, Tokyo (JP)

(72) Inventors: Shuhei Sakamoto, Musashino (JP);
Masahiko Hayashi, Musashino (JP);
Masaya Nohara, Musashino (JP);
Mikayo Iwata, Musashino (JP);
Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 37 days.

(21) Appl. No.: 17/049,538

(22) PCT Filed: May 14, 2019

(86) PCT No.: PCT/JP2019/019094
§ 371 (c)(1),
(2) Date: Oct. 21, 2020

(87) PCT Pub. No.: WO2019/221109
PCT Pub. Date: Nov. 21, 2019

(65) Prior Publication Data
US 2021/0273280 A1      Sep. 2, 2021

(30) Foreign Application Priority Data
May 15, 2018    (JP) .............................. JP2018-093654

(51) Int. Cl.
*H01M 12/08*    (2006.01)
*H01M 4/38*    (2006.01)
*H01M 10/0565*    (2010.01)

(52) U.S. Cl.
CPC .......... *H01M 12/08* (2013.01); *H01M 4/382* (2013.01); *H01M 10/0565* (2013.01); *H01M 2300/0031* (2013.01)

(58) Field of Classification Search
CPC .. H01M 12/08; H01M 4/382; H01M 10/0565; H01M 2300/0031
See application file for complete search history.

(56) References Cited

U.S. PATENT DOCUMENTS

2013/0137002 A1* 5/2013 Lee ........................ H01M 12/06
429/405
2013/0230783 A1* 9/2013 Amine .................. H01M 50/44
977/773

(Continued)

FOREIGN PATENT DOCUMENTS

JP            2017004610      *   1/2017

OTHER PUBLICATIONS

Matsuda et. al. J. Phys. Chem. C 2014, 118, 18397-18400. (Year: 2014).*

(Continued)

*Primary Examiner* — Alexander Usyatinsky
(74) *Attorney, Agent, or Firm* — Workman Nydegger

(57) ABSTRACT

Provided is a rechargeable lithium-air battery that improves charge-discharge energy efficiency and has good charge-discharge cycle performance. The rechargeable lithium-air battery includes: an air electrode including carbon; a negative electrode including metallic lithium or a lithium-containing substance; and an electrolyte in contact with the air electrode and the negative electrode. The electrolyte includes a salen-based metal complex and a quinone. The quinone includes any one or more of anthraquinone, 2,5-dihydroxy-1,4-benzoquinone, 7,7,8,8-tetracyanodimethane, (Continued)

2,3-dichloro-5,6-dicyano-1,4-benzoquinone, tetrahydroxy-1,4-benzoquinone, and 2,5-di-tert-butyl-1,4-benzoquinone.

7 Claims, 3 Drawing Sheets

(56) References Cited

U.S. PATENT DOCUMENTS

2015/0338368 A1* 11/2015 Viens ................ G01N 27/4112
  205/780.5
2017/0244131 A1*  8/2017 Kaye .................. H01M 10/052

OTHER PUBLICATIONS

JP201700461 MT (Year: 2017).*
Hu et al. Nano Lett. 2017, 17, 2073-2078 (Year: 2017).*
2018093654,Decision_to_Grant_a_Patent_(TRANSLATED),Oct. 5, 2021 (Year: 2021).*
International Search Report dated Aug. 13, 2019, issued in PCT Application No. PCT/JP2019/019094, filed May 14, 2019.
Bei Wang et al., *Graphene-Supported SnO₂ Nanoparticles Prepared by a Solvothermal Approach for an Enhanced Electrochemical Performance in Lithium-Ion Batteries*, Nanoscale Research Letters, vol. 7, No. 215, Apr. 13, 2012, pp. 1-7.
Aurelie Debart et al., *An $O_2$ Cathode for Rechargeable Lithium Batteries: The Effect of a Catalyst*, Journal of Power Sources, vol. 174, No. 2, 2007, pp. 1177-1182.

* cited by examiner

102 Negative electrode   103 Electrolyte (organic electrolyte solution)   101 Positive electrode (air electrode)

Salen-based metal complex (R,R)-(-)-N,N'-Bis(3,5-di-tert-butylsalicylidene)-1,2-cyclohexanediamino M(III) chloride M = Cr, Mn, Fe or Co (only Co has no Cl group)

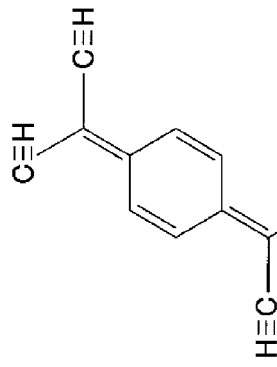
Fig. 3 (a) Anthraquinone (AQ)
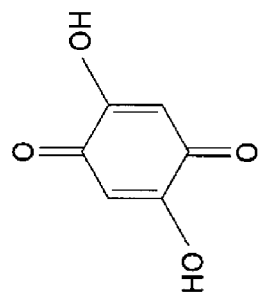
Fig. 3 (b) 2,5-Dihydroxy-1,4-benzoquinone (DHBQ)
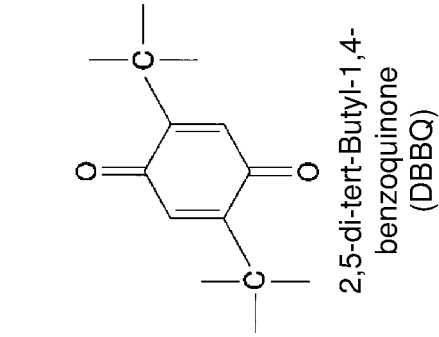
Fig. 3 (c) 7,7,8,8-Tetracyanodimethane (TCNQ)
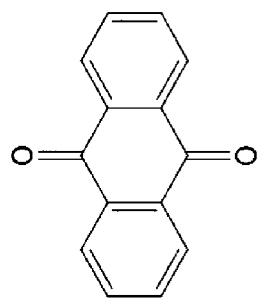
Fig. 3 (d) 2,3-Dichloro-5,6-dicyano-1,4-benzoquinone (DDQ)
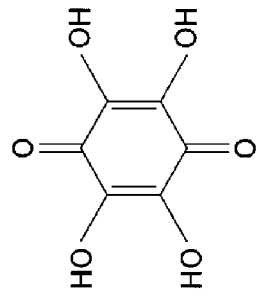
Fig. 3 (e) Tetrahydroxy-1,4-benzoquinone (THBQ)
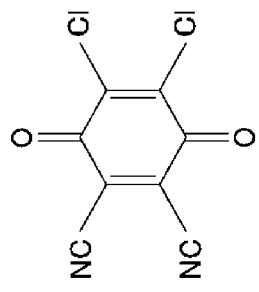
Fig. 3 (f) 2,5-di-tert-Butyl-1,4-benzoquinone (DBBQ)

LITHIUM AIR SECONDARY BATTERY

TECHNICAL FIELD

The present invention relates to a rechargeable lithium-air battery.

BACKGROUND ART

Rechargeable lithium-air batteries using oxygen in air as a positive-electrode active material can fill the inside of the battery with a large amount of metallic zinc, a negative-electrode active material, because oxygen is constantly supplied from the outside of the battery. Hence, the rechargeable lithium-air battery is known to be able to increase the value of discharge capacity per unit volume of the battery.

An attempt has been made so far to improve battery performance such as discharge capacity and cycle characteristics by adding a catalyst to a gas diffusion-type air electrode serving as a positive electrode, or by laminating a gas diffusion layer on an air electrode.

For example, Non-Patent Literature 1 discusses use of $SnO_2$ as an electrode catalyst for an air electrode. Non-Patent Literature 2 discusses use of, mainly, transition metal oxide such as iron oxide ($FeO_3$) or cobalt oxide ($Co_3O_4$) as a catalyst for an air electrode.

CITATION LIST

Non-Patent Literature

Non-Patent Literature 1: B. Wang, et al., "Graphene-supported SnO2 nanoparticles prepared by a solvothermal approach for an enhanced electrochemical performance in lithium-ion batteries", Nanoscale Research Letters, a SpringerOpen Journal, 2012, 7: 215

Non-Patent Literature 2: Aurelie Debart, et al., "An O2 cathode for rechargeable lithium batteries: The effect of a catalyst", Journal of Power Sources, Elsevier B.V., 2007, 174, p. 1177-p. 1182

SUMMARY OF THE INVENTION

Technical Problem

However, in the rechargeable battery of Non-Patent Literature 1, the initial discharge capacity of a cell supplemented with $SnO_2$ exhibits 1542 mAh/g, which is improved by 3 times as compared with a cell unsupplemented with the catalyst, whereas its discharge capacity retention after 10 cycles exhibits a relative high numeric value of approximately 37%1, which is however insufficient for practical use.

In study on 9 types of catalysts, the rechargeable battery of Non-Patent Literature 2 produces a relatively large discharge capacity of 1000 to 3000 nAh/g per weight of carbon contained in an air electrode, whereas its discharge capacity retention after 10 cycles is 2%, which is insufficient for practical use.

Thus, unfortunately, the conventional rechargeable lithium-air batteries have failed to obtain sufficient characteristics as rechargeable batteries.

The present invention has been made in light of such problems, and an object of the present invention is to provide a rechargeable lithium-air battery having an improved discharge capacity and discharge capacity retention.

Means for Solving the Problem

In summary, the rechargeable lithium-air battery according to one mode of the present embodiment comprises: an air electrode comprising carbon; a negative electrode comprising metallic lithium or a lithium-containing substance; and an electrolyte in contact with the air electrode and the negative electrode, wherein the electrolyte comprises a salen-based metal complex and a quinone.

Effects of the Invention

The present invention can provide a rechargeable lithium-air battery that improves charge-discharge energy efficiency and has good charge-discharge cycle performance.

BRIEF DESCRIPTION OF DRAWINGS

FIG. 3 is a diagram showing the structural formula of an additive (quinone).

DESCRIPTION OF EMBODIMENTS

Hereinafter, the embodiments of the present invention will be described with reference to the drawings.

Summary of Rechargeable Lithium-Air Battery

Figure 1:
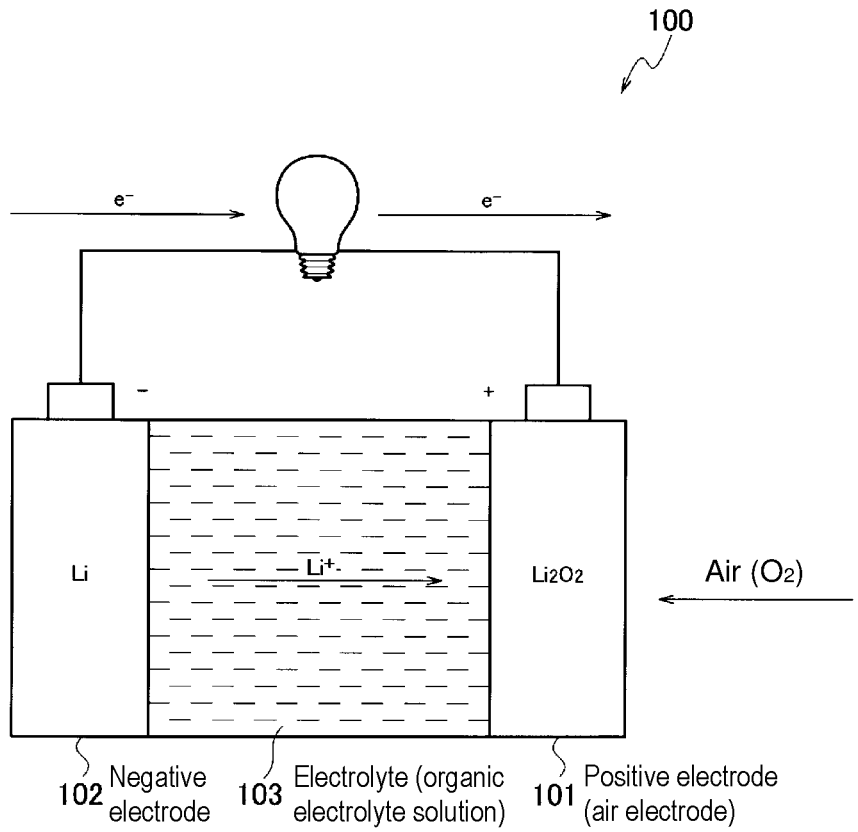
FIG. 1 is a conceptual diagram schematically showing the configuration of the rechargeable lithium-air battery according to an embodiment of the present invention.

FIG. 1 is a basic conceptual diagram of the rechargeable lithium-air battery of the present embodiment. As shown in this drawing, a rechargeable lithium-air battery 100 comprises: an air electrode 101 serving as a positive electrode; a negative electrode 102 configured to comprise lithium; and an electrolyte 103 flanked by the air electrode 101 and the negative electrode 102.

The air electrode 101 can comprise a catalyst and an electroconductive material as components. The negative electrode 102 can comprise metallic lithium or a substance, such as a lithium-containing alloy, which can release and absorb lithium ions, as a component. The electrolyte 103 of the present embodiment comprises a salen-based metal complex and a quinone as additives for electrolytes.

Hereinafter, each component of the rechargeable lithium-air battery 100 of the present embodiment will be described. In this context, the electrolyte solution refers to an electrolyte in a liquid form.

(I) Electrolyte (Electrolyte Solution)

The electrolyte of the rechargeable lithium-air battery 100 comprises at least a quinone as an additive. More specifically, the electrolyte 103 comprises a Li salt and an organic solvent and comprises a salen-based metal complex and a quinone as additives.

Figure 2:
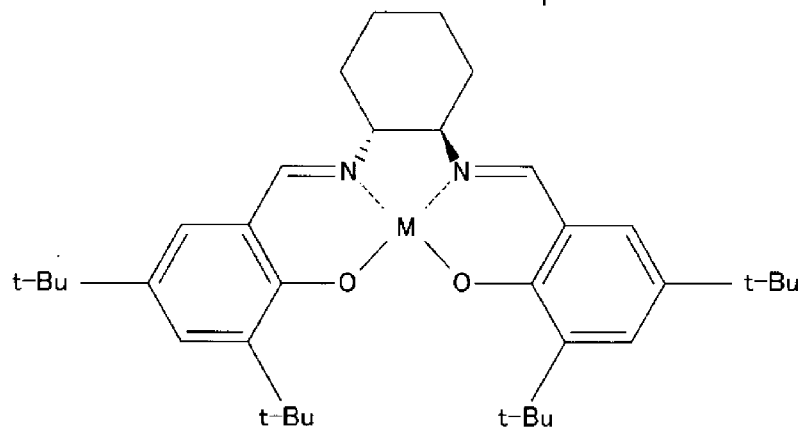
FIG. 2 is a diagram showing the structural formula of an additive (salen-based metal complex).

FIG. 2 shows the structural formula of the salen-based metal complex. The salen-based metal complex is preferably selected from among, for example, (R,R)-(−)-N,N'-bis(3,5-di-tert-butylsalicylidene)-1,2-cyclohexanediaminochromium(III) chloride (CrSl), (R,R)-(−)-N,N'-bis(3,5-di-tert-butylsalicylidene)-1,2-cyclohexanediaminomanganese(III) chloride (MnSl), (R,R)-(−)-N,N'-bis(3,5-di-tert-butylsalicylidene)-1,2-cyclohexanediaminoiron(III) chloride (FeSl), and (R,R)-(−)-N,N'-bis(3,5-di-tert-butylsalicylidene)-1,2-cyclohexanediaminocobalt(II)) (CoSl).

FIG. 3 shows the structural formula of the quinone. The quinone is preferably selected from among, for example, anthraquinone (AQ) (FIG. 3(a)), 2,5-dihydroxy-1,4-benzoquinone (DHBQ) (FIG. 3(b)), 7,7,8,8-tetracyanodimethane (TCNQ) (FIG. 3(c)), 2,3-dichloro-5,6-dicyano-1,4-benzoquinone (DDQ) (FIG. 3(d)), tetrahydroxy-1,4-benzoquinone (THBQ) (FIG. 3(e)), and 2,5-di-tert-butyl-1,4-benzoquinone (DBBQ) (FIG. 3(f)).

The salen-based metal complex or the quinone may be used as one type of those described above, or as a mixture of two or more types thereof. The mixing ratio of the mixture is not particularly limited and may be any ratio.

The electrolyte 103 comprises a Li salt together with the salen-based metal complex and the quinone. The Li salt is supplied from a metal salt comprising lithium. Examples of the metal salt can include solute metal salts such as lithium hexafluorophosphate ($LiPF_6$), lithium perchlorate ($LiClO_4$), and lithium trifluoromethanesulfonylimide (LiTFSA) [$(CF_3SO_2)_2NLi$].

The electrolyte 103 also comprises a solvent. Examples of the solvent can include: carbonic acid ester-based solvents such as dimethyl carbonate (DMC), methylethyl carbonate (MEC), methylpropyl carbonate (MPC), methylisopropyl carbonate (MIPC), methylbutyl carbonate (MBC), diethyl carbonate (DEC), ethylpropyl carbonate (EPC), ethylisopropyl carbonate (EIPC), ethylbutyl carbonate (EBC), dipropyl carbonate (DPC), diisopropyl carbonate (DIPC), dibutyl carbonate (DBC), ethylene carbonate (EC), propylene carbonate (PC), and 1,2-butylene carbonate (1,2-BC); ether-based solvents such as 1,2-dimethoxyethane (DME), diethylene glycol dimethyl ether, triethylene glycol dimethyl ether, and tetraethylene glycol dimethyl ether; and lactone-based solvents such as γ-butyrolactone (GBL); and mixed solvents of two or more types of these solvents. In the present embodiment, the mixing ratio of the mixed solvent is not particularly limited.

The salen-based metal complex and the quinone in the organic electrolyte solution are each added at a concentration of 1.0 mmol/L or higher with respect to the amount of the organic electrolyte solution and are preferably present with a saturated concentration. The saturated concentration is determined by absorbance measurement. Higher salen-based metal complex and quinone concentrations in the organic electrolyte solution produce better battery characteristics. Therefore, in the present embodiment, the salen-based metal complex and the quinone are desirably added with a saturated concentration of the organic electrolyte solution to be supplemented.

(II) Air Electrode (Positive Electrode)

The air electrode 101 of the rechargeable lithium-air battery 100 comprises at least an electroconductive material and optionally comprises a catalyst and/or a binder, etc.

(II-1) Electroconductive Material

The electroconductive material comprised in the air electrode 101 of the present embodiment is suitably carbon. Examples of the electroconductive material can include carbon blacks such as ketjen black and acetylene black, activated carbons, graphites, carbon fibers, carbon sheets, and carbon cloths.

(II-2) Catalyst

The catalyst in the air electrode 101 of the present embodiment is not particularly limited as long as the catalyst is a heretofore known oxide catalyst, such as manganese oxide ($MnO_2$) or ruthenium oxide ($RuO_2$), which is highly active against both reactions of oxygen reduction (discharge) and oxygen generation (charge). Specifically, a simple oxide such as $MnO_2$, $Mn_3O_4$, $MnO$, $FeO_2$, $Fe_3O_4$, $FeO$, $CoO$, $Co_3O_4$, $NiO$, $NiO_2$, $V_2O_5$, or $WO_3$, or a complex oxide having a perovskite-type structure such as $La_{0.6}Sr_{0.4}MnO_3$, $La_{0.6}Sr_{0.4}FeO_3$, $La_{0.6}Sr_{0.4}CoO$, $La_{0.6}Sr_{0.4}CoO_3$, $Pr_{0.6}Ca_{0.4}MnO_3$, $LaNiO_3$, or $La_{0.6}Sr_{0.4}Mn_{0.4}Fe_{0.6}O_3$ can be used. These catalysts can be synthesized by a known process such as a solid-phase method or a liquid-phase method.

Alternatively, a macrocyclic metal complex, such as porphyrin or phthalocyanine, containing at least one transition metal such as Mn, Fe, Co, Ni, V, or W as a central metal may be used as the catalyst to be added to the air electrode 101. These metal complexes may be activated by heat treatment in an inert gas atmosphere after mixing with carbon.

Not only the compound system described above but an elementary metal of a noble metal such as Pt, Au, or Pd, or a transition metal such as Co, Ni, or Mn may be used as the catalyst to be added to the air electrode 101. For example, any of these metals highly dispersed and supported on carbon can exert high activity.

In the air electrode 101 of the rechargeable lithium-air battery 100 according to the present embodiment, electrode reaction proceeds at a three-phase site of electrolyte solution/electrode catalyst/gas (oxygen). Specifically, the electrolyte 103 (organic electrolyte solution) penetrates into the air electrode 101. At the same time, oxygen gas in the atmosphere is supplied thereto to form a three-phase site where the electrolyte solution, the electrode catalyst, and the gas (oxygen) coexist. The high activity of the electrode catalyst allows oxygen reduction (discharge) and oxygen generation (charge) to proceed smoothly so that battery characteristics are largely improved.

Discharge reaction in the air electrode 101 can be represented as follows.

$$2Li^+ + (1/2)O_2 + 2e^- \rightarrow Li_2O \qquad (1)$$

$$2Li^+ + O_2 + 2e^- \rightarrow Li_2O_2 \qquad (2)$$

The lithium ion ($Li^+$) in the expressions is dissolved in the organic electrolyte solution through electrochemical oxidation from the negative electrode 102 and moves through this organic electrolyte solution to the air electrode surface. The oxygen ($O_2$) is incorporated in the inside of the air electrode from the atmosphere (air). The material ($Li^+$) dissolved from the negative electrode 102, the material ($Li_2O_2$) precipitated in the air electrode 101, and air ($O_2$) are shown together with the components of FIG. 1.

In the oxide, particularly, manganese oxide ($MnO_2$), ruthenium oxide ($RuO_2$), or the like, which can be used as the electrode catalyst for the air electrode (positive electrode) 101, manganese or ruthenium is capable of residing as an ion having a valence such as +4 or +3. Depending on conditions for synthesizing these oxides, a vacancy that can incorporate oxygen (also referred to as an oxygen vacancy herein) is present in the oxide such as manganese oxide or ruthenium oxide and probably functions as an active site. Hence, such an oxide catalyst strongly interacts with oxygen, a positive-electrode active material, and thus, can adsorb many oxygen species onto the oxide surface, or can occlude oxygen species into the oxygen vacancy.

The oxygen species thus adsorbed on the oxide surface or occluded in the oxygen vacancy are used as an oxygen source (active intermediate reactant) of the expressions (1) and (2) in oxygen reduction reaction so that the reaction proceeds easily. Also, the oxide described above has activity against charge reaction, a reverse reaction of the expressions (1) and (2). Thus, battery charge, i.e., oxygen generation reaction on the air electrode, also proceeds efficiently. In this way, the oxide such as manganese oxide or ruthenium oxide functions effectively as an electrode catalyst.

For the rechargeable lithium-air battery 100 according to the present embodiment, it is desirable that more reaction sites causing electrode reaction (three-phase sites of electrolyte solution/electrode catalyst/air (oxygen) described above) should be present in order to enhance the efficiency of the battery. From such a viewpoint, in the present embodiment, it is important that the three-phase site mentioned above should be present in a large amount on the electrode catalyst surface, and the catalyst used preferably has a higher specific surface area. For example, a specific surface area of 10 m²/g or higher is suitable after calcination.

(II-3) Binder

The air electrode 101 can comprise a binder. Examples of this binder can include, but are not particularly limited to, polytetrafluoroethylene (PTFE), polyvinylidene fluoride (PVDF), and polybutadiene rubber. These binders can be used as a powder or a dispersion.

In the rechargeable lithium-air battery 100 of the present embodiment, the catalyst content of the air electrode 101 is desirably, for example, more than 0 and less than 100% by weight, with respect to the weight of the air electrode 101. The proportions of the other components are the same as those of conventional rechargeable lithium-air batteries.

(II-4) Preparation of Air Electrode

The air electrode 101 can be prepared as described below. An oxide powder serving as a catalyst, a carbon powder, and a binder powder such as polyvinylidene fluoride (PVDF) are mixed in predetermined amounts. This mixture can be pressure-bonded onto a support such as a titanium mesh to form the air electrode 101. Alternatively, the mixture may be dispersed in a solvent such as an organic solvent to prepare slurry, which can then be applied onto a metal mesh, a carbon cloth, or a carbon sheet and dried to form the air electrode 101.

In order to enhance the strength of the electrode and to prevent the leakage of the electrolyte solution, air electrode 101 having better stability can be produced not only by cold pressing but by the application of hot pressing.

One side of the electrode constituting the air electrode 101 is exposed to the atmosphere, and the other side is in contact with the electrolyte solution.

(III) Negative Electrode

The rechargeable lithium-air battery 100 of the present embodiment comprises a negative-electrode active material in the negative electrode 102. This negative-electrode active material is not particularly limited as long as the material can be used as a negative electrode material for rechargeable lithium batteries. Examples thereof can include metallic lithium. Alternatively, the material is a lithium-containing substance, and examples thereof can include alloys of lithium, silicon, and tin, and lithium nitrides such as $Li_{2.6}Co_{0.4}N$, which are substances that can release and occlude lithium ions.

The negative electrode 102 can be formed by a known method. In the case of using, for example, lithium metal, in the negative electrode, a plurality of metallic lithium foils can be layered and formed into a predetermined shape to produce the negative electrode 102.

In the case of using the alloy of silicon or the alloy of tin described above in the negative electrode, silicon or tin, etc. containing no lithium may be used in the synthesis of the negative electrode 102. However, in this case, the silicon or the tin needs to be treated by a chemical approach or an electrochemical approach (e.g., a method of assembling an electrochemical cell, and alloying lithium with silicon or lithium with tin) prior to air battery production so as to be in a state containing lithium. Specifically, a working electrode comprises silicon or tin, and lithium is used in a counter electrode. A treatment such as alloying is preferably performed by injecting reduction current in the organic electrolyte solution.

In this context, a reaction in the negative electrode (metallic lithium) at the time of discharge can be represented as follows.

(Discharge reaction)

$$Li \rightarrow Li^+ + e^- \quad (2)$$

In the negative electrode 102 at the time of charge, lithium precipitation reaction, a reverse reaction of the expression (2), takes place.

(IV) Other Factors

The rechargeable lithium-air battery 100 of the present embodiment can comprise structural members such as a separator, a battery case, and a metal mesh (e.g., a titanium mesh), and other factors required for rechargeable lithium-air batteries, in addition to the components described above. Conventional factors can be used as these factors.

Production of Rechargeable Lithium-Air Battery

A cell (single cell) of the rechargeable lithium-air battery 100 was produced by the procedures described below. Hereinafter, the term "cell" will be omitted.

A ketjen black powder and a polyvinylidene fluoride (PVDF) powder were thoroughly mixed at a weight ratio of 9:1 into N-methyl-2-pyrrolidone (NMP) using a mixer to produce slurry. This slurry was applied to a carbon paper having a diameter of 17 mm, placed in a vacuum dryer of 90° C., and dried overnight to obtain gas diffusion-type air electrode 101.

Figure 4:
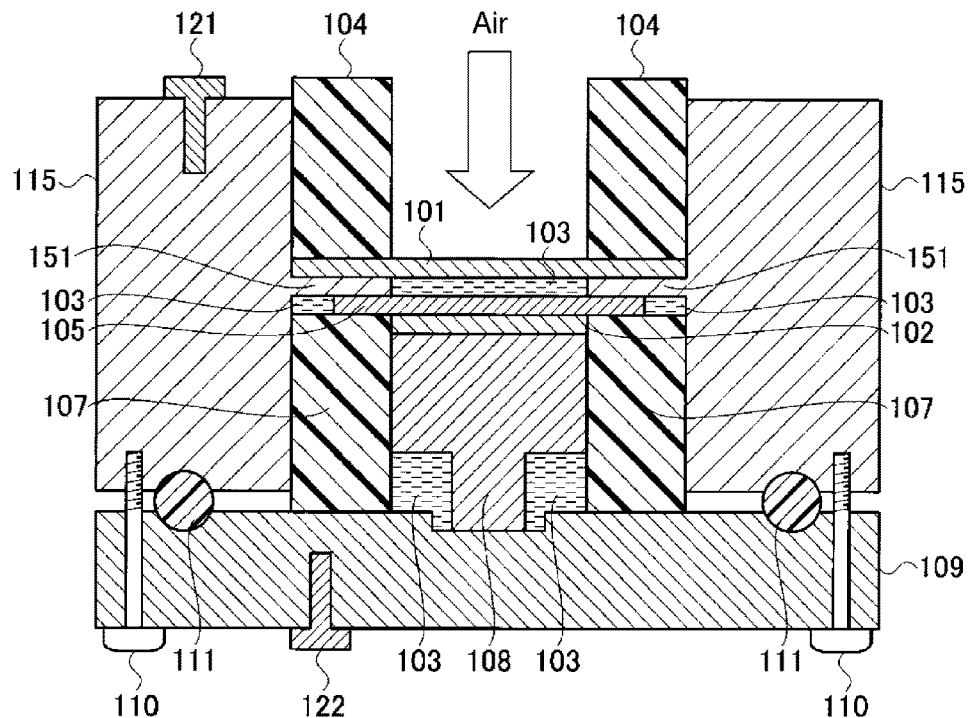
FIG. 4 is a cross-sectional view showing a more detailed exemplary configuration of the rechargeable lithium-air battery according to an embodiment of the present invention.

FIG. 4 is a cross-sectional view of the rechargeable lithium-air battery 100. The rechargeable lithium-air battery 100 was produced by the procedures described below in dry air having a dew point of −60° C. or lower.

The air electrode (positive electrode) 101 prepared by the method described above was placed in a depression of an air electrode support 115 coated with PTFE, and fixed with a ring 104 for air electrode fixation. The contact site between the air electrode 101 and the air electrode support 101 was not coated with PTFE in order to take electric contact.

Next, a separator 105 for rechargeable lithium-air batteries was placed on the bottom of the depression on a side opposite to the side on which the air electrode 101 came into contact with the atmosphere. Subsequently, four metallic lithium foils each having a thickness of 150 μm were concentrically layered and pressure-bonded as negative electrode 102 to a washer 108 for negative electrode fixation as shown in FIG. 4.

Subsequently, a ring 107 for negative electrode fixation was placed in another depression facing the depression provided with the air electrode 101. A washer 108 for negative electrode fixation with metallic lithium pressure-bonded to the central portion was further placed therein. Subsequently, an O-ring 111 was placed on the underside of the air electrode support 115 as shown in FIG. 4.

Next, the inside of the cell (between the air electrode (positive electrode) 1 and the negative electrode 8) was filled with an organic electrolyte solution (electrolyte 103). The cell was covered with a negative electrode support 109, and the whole cell was fixed with a fixation screw 110 coated with PTFE. The organic electrolyte solution used was an organic electrolyte solution prepared by dissolving "LiTFSA described above at a concentration of 1 mol/L in an organic solvent TEGDME, and mixing therewith CrSl and AQ as additives with saturated concentrations.

Subsequently, an air electrode terminal 121 was installed in the air electrode support 115, and a negative electrode terminal 122 was installed in the negative electrode support 109.

Cycle Test of Battery

Next, the cycle test of the battery will be described. For the cycle test of the battery, current was applied to the battery at a current density of 100 mA/g per weight of the air electrode 101 using a charge-discharge measurement system (manufactured by Bio-Logic Science Instruments Ltd.), and discharge voltage was measured until the battery voltage decreased to 2.0 V from open-circuit voltage. The charge test of the battery was conducted until the battery voltage reached 4.4 V at the same current density as that at the time of discharge. The charge-discharge test of the battery was conducted in an ordinary living environment. The charge-discharge capacity was indicated by a value (mAh/g) per weight of the air electrode (carbon+oxide+PVDF).

Experimental Examples will be described in which the rechargeable lithium-air battery 100 according to the present embodiment was evaluated for its battery performance using varying solvents for the electrolyte (organic electrolyte solution) 103 and varying additives contained in the electrolyte.

Experimental Example 1

The electrolyte 103 used in Experimental Example 1 is an organic electrolyte solution containing (R,R)-N,N'-bis(3,5-di-tert-butylsalicylidene)-1,2-cyclohexanediaminochromium(III) chloride (CrSl) and anthraquinone (AQ).

CrSl (manufactured by Sigma-Aldrich Co. LLC) and AQ (manufactured by Sigma-Aldrich Co. LLC) were mixed into the organic electrolyte solution. For mixing, dispersion for approximately 30 minutes was performed using an ultrasonic washing machine at the maximum output. For the organic electrolyte solution, LiTFSA was dissolved at a concentration of 1 mol/L in an organic solvent TEGDME. This organic electrolyte solution was mixed with the additives CrSl and AQ with saturated concentrations.

Comparative Example

The electrolyte of a rechargeable lithium-air battery used in Comparative Example to be compared with the rechargeable lithium-air battery 100 according to the present embodiment was an organic electrolyte solution of a 1 mol/L solution of LiTFSA in TEGDME. The conditions other than the organic electrolyte solution were the same as those of Experimental Example 1.

Figure 5:
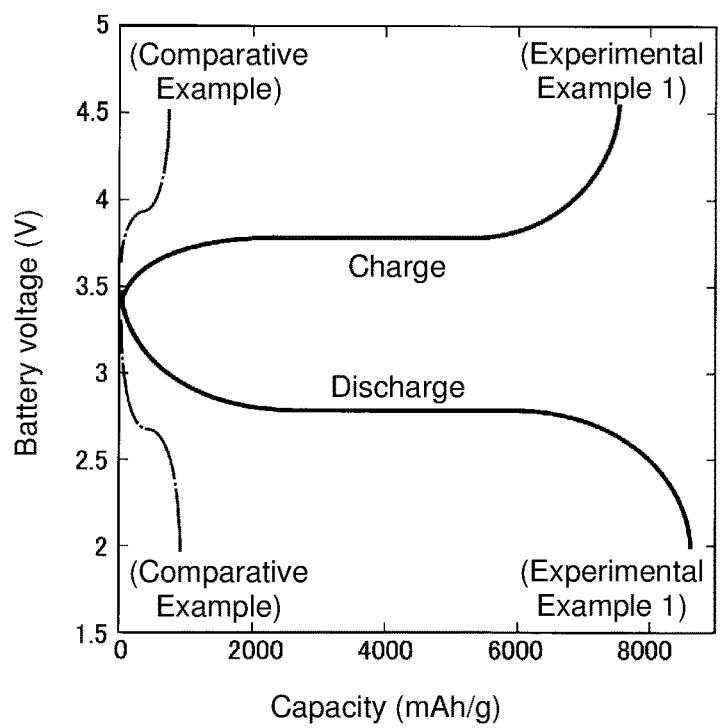
FIG. 5 is a diagram showing the discharge characteristics of the rechargeable lithium-air battery according to an embodiment of the present invention.

FIG. 5 shows one example of an initial discharge-charge curve of the rechargeable lithium-air battery 100 of Experimental Example 1. The abscissa of FIG. 5 depicts charge-discharge capacity (mAh/g), and the ordinate thereof depicts battery voltage (V). In the drawing, the characteristics indicated by the solid line are the characteristics of Experimental Example 1, and the characteristics indicated by the alternate long and short dash line are the characteristics of Comparative Example.

As shown in FIG. 5, the initial discharge capacity of Experimental Example 1 was 8578 mAh/g, and the capacity retention at the 10th cycle was 75%. The initial discharge capacity of Comparative Example was 742 mAh/g, and the capacity retention at the 10th cycle was 4%.

The initial discharge capacity and the capacity retention of the rechargeable lithium-air battery 100 (Experimental Example 1) according to the present embodiment exhibited characteristics better than those of Comparative Example. Thus, the rechargeable lithium-air battery 100 using a 1 mol/L solution of LiTFSA in TEGDME containing CrSl-AQ as the organic electrolyte solution was able to be confirmed to improve battery characteristics. Hereinafter, the experimental conditions of the experiments using varying additives contained in the organic electrolyte solution will be given.

Experimental Example 2

Experimental Example 2 employed an organic electrolyte solution containing CrSl and 2,5-dihydroxy-1,4-benzoquinone (DHBQ).

The additives CrSl (manufactured by Sigma-Aldrich Co. LLC) and DHBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 2 was 6927 mAh/g, and the capacity retention at the 10th cycle was 56%. The respective evaluation results of Experimental Examples are summarized in Table 1 shown later.

Experimental Example 3

Experimental Example 3 employed an organic electrolyte solution containing CrSl and 7,7,8,8-tetracyanodimethane (TCNQ).

The additives CrSl (manufactured by Sigma-Aldrich Co. LLC) and TCNQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 3 was 8180 mAh/g, and the capacity retention at the 10th cycle was 69%.

Experimental Example 4

Experimental Example 4 employed an organic electrolyte solution containing CrSl and 2,3-dichloro-5,6-dicyano-1,4-benzoquinone (DDQ).

The additives CrSl (manufactured by Sigma-Aldrich Co. LLC) and DDQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 4 was 7001 mAh/g, and the capacity retention at the 10th cycle was 53%.

Experimental Example 5

Experimental Example 5 employed an organic electrolyte solution containing CrSl and tetrahydroxy-1,4-benzoquinone (THBQ).

The additives CrSl (manufactured by Sigma-Aldrich Co. LLC) and THBQ (manufactured by Tokyo Chemical Industry Co., Ltd.) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 5 was 7668 mAh/g, and the capacity retention at the 10th cycle was 82%.

Experimental Example 6

Experimental Example 6 employed an organic electrolyte solution containing CrSl and 2,5-di-tert-butyl-1,4-benzoquinone (DBBQ).

The additives CrSl (manufactured by Sigma-Aldrich Co. LLC) and DBBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 6 was 8149 mAh/g, and the capacity retention at the 10th cycle was 66%.

Experimental Example 7

Experimental Example 7 employed an organic electrolyte solution containing (R,R)-N,N'-bis(3,5-di-tert-butylsalicylidene)-1,2-cyclohexanediaminomanganese(III) chloride (MnSl) and AQ.

The additives MnSl (manufactured by Sigma-Aldrich Co. LLC) and AQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 7 was 8911 mAh/g, and the capacity retention at the 10th cycle was 65%.

Experimental Example 8

Experimental Example 8 employed an organic electrolyte solution containing MnSl and DHBQ.

The additives MnSl (manufactured by Sigma-Aldrich Co. LLC) and DHBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 8 was 7771 mAh/g, and the capacity retention at the 10th cycle was 70%.

Experimental Example 9

Experimental Example 9 employed an organic electrolyte solution containing MnSl and TCNQ.

The additives MnSl (manufactured by Sigma-Aldrich Co. LLC) and TCNQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 9 was 7719 mAh/g, and the capacity retention at the 10th cycle was 67%.

Experimental Example 10

Experimental Example 10 employed an organic electrolyte solution containing MnSl and DDQ.

The additives MnSl (manufactured by Sigma-Aldrich Co. LLC) and DDQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 10 was 8861 mAh/g, and the capacity retention at the 10th cycle was 72%.

Experimental Example 11

Experimental Example 11 employed an organic electrolyte solution containing MnSl and THBQ.

The additives MnSl (manufactured by Sigma-Aldrich Co. LLC) and THBQ (manufactured by Tokyo Chemical Industry Co., Ltd.) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 11 was 7773 mAh/g, and the capacity retention at the 10th cycle was 78%.

Experimental Example 12

Experimental Example 12 employed an organic electrolyte solution containing MnSl and DBBQ.

The additives MnSl (manufactured by Sigma-Aldrich Co. LLC) and DBBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 12 was 7856 mAh/g, and the capacity retention at the 10th cycle was 91%.

Experimental Example 13

Experimental Example 13 employed an electrolyte solution containing (R,R)-N,N'-bis(3,5-di-tert-butylsalicylidene)-1,2-cyclohexanediaminoiron(III) chloride (FeSl) and AQ.

FeSl was obtained by reacting (R,R)-(−)-N,N'-bis(3,5-di-tert-butylsalicylidene)-1,2-dichlorohexanediamine (manufactured by Sigma-Aldrich Co. LLC) with iron(III) chloride (manufactured by Wako Pure Chemical Industries, Ltd.) under basic conditions. The additives FeSl thus produced and AQ (manufactured by Sigma-Aldrich Co. LLC) were mixed with saturated concentrations into the organic electrolyte solution. A cell was produced and evaluated for battery characteristics with all of other conditions set to the same as those of Experimental Example 1.

The initial discharge capacity of Experimental Example 13 was 8446 mAh/g, and the capacity retention at the 10th cycle was 63%.

Experimental Example 14

Experimental Example 14 employed an organic electrolyte solution containing FeSl and DHBQ.

FeSl was produced by the same procedures as in Experimental Example 13. The additives FeSl thus produced and DHBQ (manufactured by Sigma-Aldrich Co. LLC) were mixed with saturated concentrations into the organic electrolyte solution. A cell was produced and evaluated for battery characteristics with all of other conditions set to the same as those of Experimental Example 1.

The initial discharge capacity of Experimental Example 14 was 8669 mAh/g, and the capacity retention at the 10th cycle was 83%.

Experimental Example 15

Experimental Example 15 employed an organic electrolyte solution containing FeSl and TCNQ.

FeSl was produced by the same procedures as in Experimental Example 13. The additives FeSl thus produced and TCNQ (manufactured by Sigma-Aldrich Co. LLC) were mixed with saturated concentrations into the organic electrolyte solution. A cell was produced and evaluated for battery characteristics with all of other conditions set to the same as those of Experimental Example 1.

The initial discharge capacity of Experimental Example 15 was 7970 mAh/g, and the capacity retention at the 10th cycle was 49%.

Experimental Example 16

Experimental Example 16 employed an organic electrolyte solution containing FeSl and DDQ.

FeSl was produced by the same procedures as in Experimental Example 13. The additives FeSl thus produced and DDQ (manufactured by Sigma-Aldrich Co. LLC) were mixed with saturated concentrations into the organic electrolyte solution. A cell was produced and evaluated for battery characteristics with all of other conditions set to the same as those of Experimental Example 1.

The initial discharge capacity of Experimental Example 16 was 8383 mAh/g, and the capacity retention at the 10th cycle was 56%.

Experimental Example 17

Experimental Example 17 employed an organic electrolyte solution containing FeSl and THBQ.

FeSl was produced by the same procedures as in Experimental Example 13. The additives FeSl thus produced and THBQ (manufactured by Tokyo Chemical Industry Co., Ltd.) were mixed with saturated concentrations into the organic electrolyte solution. A cell was produced and evaluated for battery characteristics with all of other conditions set to the same as those of Experimental Example 1.

The initial discharge capacity of Experimental Example 17 was 8860 mAh/g, and the capacity retention at the 10th cycle was 61%.

Experimental Example 18

Experimental Example 18 employed an organic electrolyte solution containing FeSl and DBBQ.

FeSl was produced by the same procedures as in Experimental Example 13. The additives FeSl thus produced and DBBQ (manufactured by Sigma-Aldrich Co. LLC) were mixed with saturated concentrations into the organic electrolyte solution. A cell was produced and evaluated for battery characteristics with all of other conditions set to the same as those of Experimental Example 1.

The initial discharge capacity of Experimental Example 18 was 6828 mAh/g, and the capacity retention at the 10th cycle was 65%.

Experimental Example 19

Experimental Example 19 employed an organic electrolyte solution containing (R,R)-N,N'-bis(3,5-di-tert-butylsalicylidene)-1,2-cyclohexanediaminocobalt(II) (CoSl) and AQ.

The additives CoSl (manufactured by Sigma-Aldrich Co. LLC) and AQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 19 was 8388 mAh/g, and the capacity retention at the 10th cycle was 68%.

Experimental Example 20

Experimental Example 20 employed an organic electrolyte solution containing CoSl and DHBQ.

The additives CoSl (manufactured by Sigma-Aldrich Co. LLC) and DHBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 20 was 8082 mAh/g, and the capacity retention at the 10th cycle was 82%.

Experimental Example 21

Experimental Example 21 employed an organic electrolyte solution containing CoSl and TCNQ.

The additives CoSl (manufactured by Sigma-Aldrich Co. LLC) and TCNQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 20 was 6908 mAh/g, and the capacity retention at the 10th cycle was 52%.

Experimental Example 22

Experimental Example 22 employed an organic electrolyte solution containing CoSl and DDQ.

The additives CoSl (manufactured by Sigma-Aldrich Co. LLC) and DDQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 20 was 7240 mAh/g, and the capacity retention at the 10th cycle was 49%.

Experimental Example 23

Experimental Example 23 employed an organic electrolyte solution containing CoSl and THBQ.

The additives CoSl (manufactured by Sigma-Aldrich Co. LLC) and THBQ (manufactured by Tokyo Chemical Industry Co., Ltd.) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 23 was 6538 mAh/g, and the capacity retention at the 10th cycle was 42%.

Experimental Example 24

Experimental Example 24 employed an organic electrolyte solution containing CoSl and DBBQ.

The additives CoSl (manufactured by Sigma-Aldrich Co. LLC) and DBBQ (manufactured by Sigma-Aldrich Co. LLC) were mixed with saturated concentrations into the organic electrolyte solution by the same procedures as in Experimental Example 1. A cell was produced and evaluated for battery characteristics with all of other conditions set to the same as those of Experimental Example 1.

The initial discharge capacity of Experimental Example 24 was 7797 mAh/g, and the capacity retention at the 10th cycle was 85%.

Table 1 shows the results of the battery performance test in Experimental Examples 1 to 24. In Table 1, the second column from the left depicts the salen-based metal complex as an additive, and the third column from the left depicts the quinone as an additive. The initial discharge capacity represents a capacity until the battery voltage decreased to 2.0 V by the application of current at a current density of 100 mA/g. The discharge capacity retention represents a value at the 10th cycle.

TABLE 1

| Experimental Example | Combination of additives | | Initial discharge capacity | Discharge capacity retention |
|---|---|---|---|---|
| 1 | CrSl | AQ | 8578 | 75 |
| 2 | CrSl | DHBQ | 6927 | 56 |
| 3 | CrSl | TCNQ | 8180 | 69 |
| 4 | CrSl | DDQ | 7001 | 53 |
| 5 | CrSl | THBQ | 7668 | 82 |
| 6 | CrSl | DBBQ | 8149 | 66 |
| 7 | MnSl | AQ | 8911 | 65 |
| 8 | MnSl | DHBQ | 7771 | 70 |
| 9 | MnSl | TCNQ | 7719 | 67 |
| 10 | MnSl | DDQ | 8861 | 72 |
| 11 | MnSl | THBQ | 7773 | 78 |
| 12 | MnSl | DBBQ | 7856 | 91 |
| 13 | FeSl | AQ | 8446 | 63 |
| 14 | FeSl | DHBQ | 8669 | 83 |
| 15 | FeSl | TCNQ | 7970 | 49 |
| 16 | FeSl | DDQ | 8383 | 56 |
| 17 | FeSl | THBQ | 8860 | 61 |
| 18 | FeSl | DBBQ | 6828 | 65 |
| 19 | CoSl | AQ | 8388 | 68 |
| 20 | CoSl | DHBQ | 8082 | 82 |
| 21 | CoSl | TCNQ | 6908 | 52 |
| 22 | CoSl | DDQ | 7240 | 49 |
| 23 | CoSl | THBQ | 6538 | 42 |
| 24 | CoSl | DBBQ | 7797 | 85 |
| Comparative Example | Not added | Not added | 742 | 4 |

As shown in Table 1, the rechargeable lithium-air battery 100 according to the present embodiment comprising the salen-based metal complex and the quinone as additives in the organic electrolyte solution was able to be confirmed to improve battery characteristics of initial discharge capacity and discharge capacity retention as compared with the rechargeable lithium-air battery (Comparative Example) comprising an organic electrolyte solution containing neither of the additives.

The initial discharge capacity exhibited the largest value (8911 mAn/g) when the organic electrolyte solution contained MnSl and AQ. The discharge capacity retention exhibited the largest value (91%) when the organic electrolyte solution contained MnSl and DBBQ.

Thus, the present invention can provide a rechargeable lithium-air battery that has a large discharge capacity and good charge-discharge cycle performance by allowing an electrolyte to contain a salen-based metal complex and a quinone as additives. The present invention is not limited by the embodiments described above, and various changes or modifications can be made in the present invention without departing from the scope of the present invention.

INDUSTRIAL APPLICABILITY

A high-performance rechargeable lithium-air battery can be produced by using a salen-based metal complex and a quinone as additives in an organic electrolyte solution, and can be effectively utilized as a drive source for various electronic devices, automobiles, etc.

REFERENCE SIGNS LIST

100: Rechargeable lithium-air battery
101: Positive electrode (air electrode)
102: Negative electrode
103: Electrolyte (organic electrolyte solution)
104: Ring for air electrode fixation
105: Separator
107: Ring for negative electrode fixation
108: Washer for negative electrode fixation
109: Negative electrode support
110: Fixation screw 111: O-ring
115: Air electrode support
121: Air electrode terminal
122: Negative electrode terminal
151: Partition

What is claimed is:

1. A rechargeable lithium-air battery comprising:
an air electrode comprising carbon;
a negative electrode comprising metallic lithium or a lithium-containing substance; and
an electrolyte in contact with the air electrode and the negative electrode, wherein the electrolyte comprises a salen-based metal complex and a quinone,
wherein the salen-based metal complex comprises at least one of (R,R)-(−)-N,N'-bis(3,5-di-tert-butylsalicylidene)-1,2-cyclohexanediaminochromium(III) chloride, (R,R)-(−)-N,N'-bis(3,5-di-tert-butylsalicylidene)-1,2-cyclohexanediaminomanganese(III) chloride, (R,R)-(−)-N,N'-bis(3,5-di-tert-butylsalicylidene)-1,2-cyclohexanediaminoiron(III) chloride, or (R,R)-(−)-N,N'-bis(3,5-di-tert-butylsalicylidene)-1,2-cyclohexanediaminocobalt(II).

2. The rechargeable lithium-air battery according to claim 1, wherein the quinone comprises at least one of anthraquinone, 2,5-dihydroxy-1,4-benzoquinone, 7,7,8,8-tetracyanodimethane, 2,3-dichloro-5,6-dicyano-1,4-benzoquinone, tetrahydroxy-1,4-benzoquinone, or 2,5-di-tert-butyl-1,4-benzoquinone.

3. The rechargeable lithium-air battery according to claim 1, wherein the salen-based metal complex is dissolved with a saturated concentration in the electrolyte.

4. The rechargeable lithium-air battery according to claim 1, wherein the quinone is dissolved with a saturated concentration in the electrolyte.

5. The rechargeable lithium-air battery according to claim 2, wherein the salen-based metal complex is dissolved with a saturated concentration in the electrolyte.

6. The rechargeable lithium-air battery according to claim 2, wherein the quinone is dissolved with a saturated concentration in the electrolyte.

7. The rechargeable lithium-air battery according to claim 3, wherein the quinone is dissolved with a saturated concentration in the electrolyte.

* * * * *